United States Patent [19]

Spence-Bate

[11] 4,093,373

[45] June 6, 1978

[54] MICROFICHE CAMERA EDITING DEVICE

[76] Inventor: Harry A. H. Spence-Bate, 115 Cheam Pl., P.O. Box 8, Morley, Australia, 6062

[21] Appl. No.: 497,463

[22] Filed: Aug. 14, 1974

[30] Foreign Application Priority Data

Aug. 15, 1973 Australia .............................. PB4486

[51] Int. Cl.[2] ...................... G03B 27/44; G03B 27/04; G03B 23/08

[52] U.S. Cl. .................................. 355/54; 353/27 R; 355/86

[58] Field of Search ............................ 355/53, 54, 86; 353/25-26, 27, 21; 352/188

[56] References Cited

U.S. PATENT DOCUMENTS

| | | | |
|---|---|---|---|
| 3,169,441 | 2/1965 | Johnson | 355/54 |
| 3,185,026 | 5/1965 | Carlson et al. | 350/190 |
| 3,284,923 | 11/1966 | Leslie | 353/26 R |
| 3,560,083 | 2/1971 | Brownscombe | 353/27 R |
| 3,563,645 | 2/1971 | Burke et al. | 353/27 |
| 3,628,865 | 12/1971 | Bate | 352/188 |
| 3,640,193 | 2/1972 | Linde et al. | 355/40 |
| 3,751,153 | 8/1973 | Naito | 353/27 |
| 3,784,303 | 1/1974 | Sullivan | 355/54 |
| 3,837,742 | 9/1974 | Wally | 355/53 |

*Primary Examiner*—Steven L. Stephan

*Attorney, Agent, or Firm*—Fidelman, wolfe & Waldron

[57] ABSTRACT

A microfiche editing device for mechanically aligning a portion of one microfilm with respect to a second microfiche along an optical path. The first microfilm may be a microfiche held and aligned by a rectangular toothed rack or a microfilm held and aligned by a double spool mechanism.

10 Claims, 12 Drawing Figures

MICROFICHE CAMERA EDITING DEVICE

BACKGROUND OF THE INVENTION

1. Field of the Invention

The present invention relates to a microfiche camera and particularly to an editing device for use as an accessory for or as an integral part of a microfiche camera.

2. Description of the Prior Art

In the commonly used method of editing microfiches, when it is required to move an image location on a first microfiche to another on a new microfiche, the image is manually cut from the first microfiche and then fixed by adhesive to the new microfiche. Clearly this method is laborious, slow and inaccurate. Thus, there exists a need for a device which can be used with presently available equipment for the editing of microfiche.

SUMMARY OF THE INVENTION

The present invention is an editing device which may be attached to, or an integral part of, a microfiche camera to transfer an image from one microfiche to a second microfiche. The microfiche editing device includes a housing carrying a first film retaining means, means for applying light from the first film means to a second microfiche along an optical path, means for locating said first film in said first film retaining means in a plurality of predetermined positions relative to the optical path. In this way, the second microfiche film can be provided with a photographic image in a different position relative to the same image on the first film. The means for locating said first microfiche film retaining means is preferably one or two pairs of 'X' and 'Y' axis notched or toothed racks, the notches or teeth being spatially dimensioned so as to correspond to the standard used on the first microfiche film.

Alternatively, the first microfiche film retaining means is held stationary with respect to the housing and the first film is a microfilm wound on a reel or cassette arranged so as to feed the microfilm across the said means for applying light.

In either embodiment, mask may be used to select the image location. The editing device may include a lens system for a 1:1 transfer of images or a system for reducing or magnifying the image during transfer.

OBJECTS OF THE INVENTION

An object of this invention is to provide an editing device which may be fitted as an accessory for, or as an integral part of, a microfiche camera and which avoids or reduces the aforesaid disadvantages.

Another object of the present invention is to provide a device which rearranges, deletes, replaces or adds images on a microfiche during transfer of the image from a second microfiche.

Other objects, advantages and novel features of the present invention will become apparent from the following detailed description of the invention when considered in conjunction with the accompanying drawings.

DESCRIPTION OF THE PREFERRED EMBODIMENTS

Figure 1:
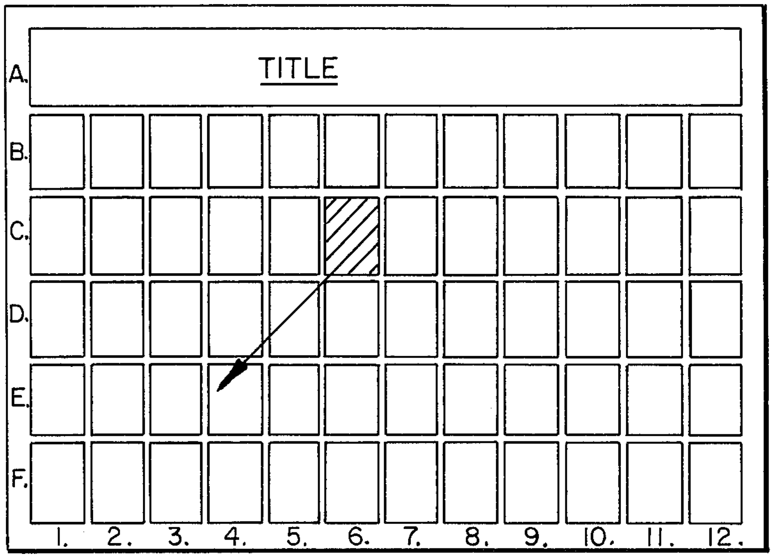
FIG. 1 shows a first microfiche in which an image is to be moved to another location on a second microfiche.

For many reasons, it is necessary when using microfiches to require to transfer an image from one location on a microfiche to another. FIG. 1 shows a standard microfiche having rows 'A' to 'F' and columns 1 to 12. Row 'A' is used for the microfiche title while separating images occupy the remaining rows 'B' to 'F'. Assume it is required to move an image at 'C6' on a first microfiche (which is shown in FIG. 1) to a different position E4 on a second microfiche. The present invention accomplishes this relocation by mechanically aligning along an optical path 'C6' on the first microfiche and 'E4' on the second microfiche.

Essentially the editing device according to the first embodiment of the invention consists of a housing in which a removable first microfiche retaining means is adjustably held. The editing device which can be fitted as an accessory to a microfiche camera is mounted below the camera lens. The camera holds a second microfiche onto which images are to be transferred.

Figure 2:
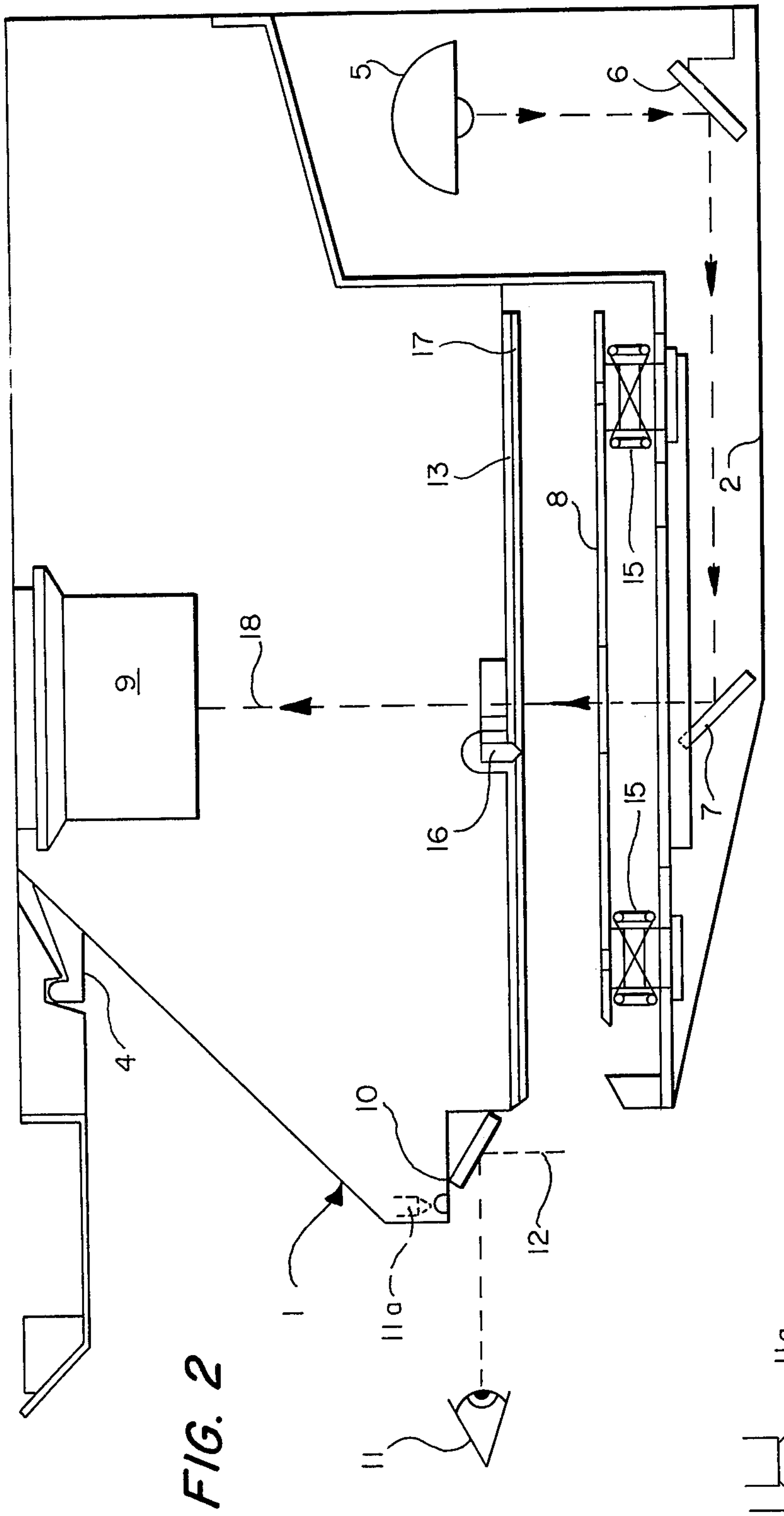
FIG. 2 shows a side part sectional view of an editing device according to the invention located in place on a microfiche camera.

In FIG. 2 there is shown the editing device 1 in the 'in use' position having a housing 2 which is slidably mounted on rails (not shown) on a microfiche camera 3. The device 1 is kept in the 'in use' position by a retaining clip 4. The first microfiche retaining means which is shown in FIGS. 3 and 4 is removed from the housing for clarity of the drawings.

The housing 2 contains a timed light source 5 which shines downward onto a first mirror 6, onto a further mirror 7 and upward through a sprung table 8 on which the first microfiche retaining means (shown complete in FIG. 3) is supported. The light then passes through a microfiche image vertically upwards to a lens 9. The housing is also provided with a microfiche grid sighting mirror 10 which enables the viewer at 11 looking straight into the editing device to look downward onto a grid 22 shown in FIG. 3, which is attached to a first microfiche retaining device 14 below the viewing line 12. A light 11a is used to illuminate the grid located below mirror 10. The retaining device 14 will be described in detail below. Also seen in FIG. 2 is a cruciform member 13 which is shown more clearly in FIG. 3. The cruciform member is used to locate the first microfiche film retaining means 14 in position on the sprung plate 8. The sprung plate 8 is provided with springs 15 which urge the first microfiche film retaining means onto the cruciform member 13. The cruciform member 13 has a 'Y' axis retaining arms 16 and 'X' axis retaining arms 17. As may be seen from FIG. 2, the arms 16 and 17 cross at a point off-set from the optical axis 18.

Figures 3, 4:
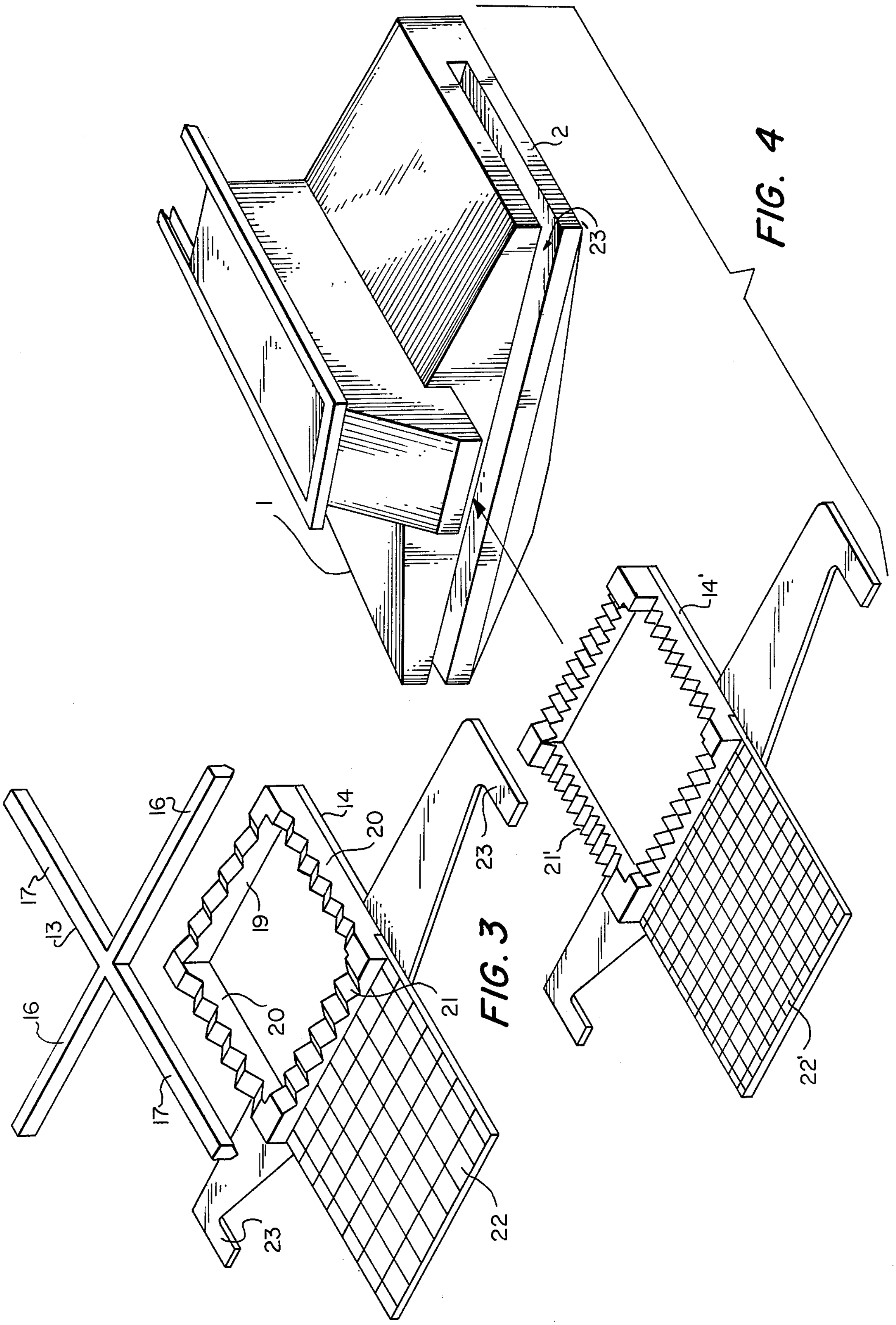
FIG. 3 shows a manually movable first microfiche film retaining means for holding the first microfiche in the editing device of FIG. 2.
FIG. 4 shows the device of FIG. 3 being inserted in the editing device of FIG. 2.

In FIG. 3, the manually movable first microfiche film retaining means can be seen at 14 having a pair of 'X' axis toothed racks 19 and a pair of toothed 'Y' axis racks 20. Though shown as four toothed racks, the locating device can also be made having a pair of (one X and one Y) of orthogonal racks. Teeth 21 are devised to angle on the 'V' shaped lower surface of the cruciform member 13. The first microfiche film retaining means 14 is also provided with a grid 22, which as previously explained, is used by the operator to locate the film retaining means 14 in the correct position under the optical axis 18. It will be seen that the grid 22 has columns and rows which correspond to the teeth 21 on the rack. The film retaining means is provided with two manually operating arms 23.

In FIG. 4, a manually operated first microfiche film retaining means 14' with a different microfiche standard to retaining means 14 can be seen being inserted into the housing 2 of the editing device shown at 1 through an opening 23'. The bottom of the racks will be supported by sprung table 8.

Figure 5:
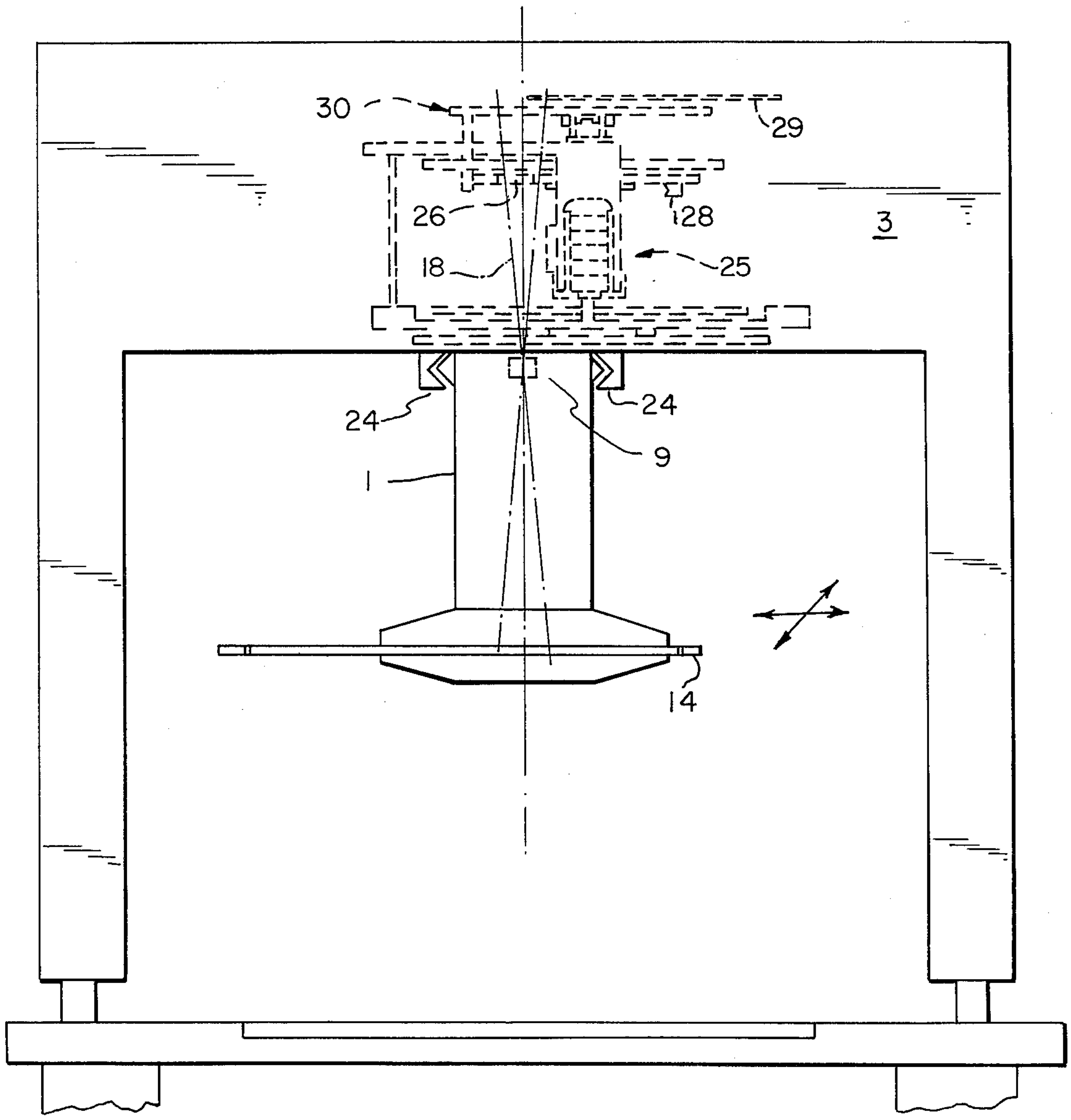
FIG. 5 shows a front view of the editing device of FIG. 2 located in place in a microfiche camera.

In FIG. 5, the editing device 1 can be seen with the first microfiche film retaining device 14 located in the 'in use' position below the optical axis 18 and mounted on the microfiche camera 3. It will be seen that the editing device is mounted on rails 24 which allow the editing device to be pushed out of the way to the rear of the microfiche camera 3. Also in FIG. 5 can be seen a microfiche camera turret 25 on which are mounted lenses 26 for use in recording documents on the microfiche 29. Further lenses (not shown) 27 for use when editing or titling, and an inverter 28 for inverting microfiches are also mounted on the microfiche turret 25. The turret is shown and explained in detail in copending application Ser. No. 348,622, filed April 6, 1973, now U.S. Pat. No. 3,826,571. Above the turret 25 there is located, in a movable holder 30 for the second microfiche 29. This holder 30 can be moved relative to the optical axis 18 by a positioning mechanism such as is shown in U.S. Pat. No. 3,628,865 or my copending British Pat. No. 15574/73, so that, in the Example given in FIG. 1, the second microfiche is moved so that the optical axis 18 is at 'E4' while the first microfiche is manually moved so that the axis 18 is at 'C6'. In this way, an image on the first or original microfiche at 'C6' can be relocated at 'E4' on the second or new microfiche 29.

When the editing device is in the 'in use' position as shown in FIG. 2, the lens turret 25 is usually rotated out of the way and a by-pass position on the turret allows optical rays to by-pass the turret on a one to one (that is, with no reduction or magnification) basis. This is standard editing. The optical arrangement of the editing device and microfiche camera can be made in such a way that a low density microfiche can be edited onto high density microfiche or vice versa. Because normally a one to one or zero magnification mode is selected, the back focal length is equal to the front focal length. The editing lens 9 is conveniently sighted in the editing device 1 and the editing device is therefore an accessory to the microfiche camera. Furthermore, it will be seen in FIG. 5 that, due to the location of lens 9, the editing device can be sighted at a convenient height for the operator to insert and position the first microfiche whose images are being transferred to the second microfiche 29.

In the editing device described, with reference to FIGS. 2 to 5, it will be appreciated that although the first microfiche films retaining means is specifically designed for microfiche, it could with little adaption carry any lamina film. Thus, in hospital or dental records, a single X-ray film could be carried which, using a suitable reducing lens on the turret, could thereby be transferred onto the second microfiche. Furthermore, with slight modification, the first microfiche film retaining means could be modified to carry a cassette or reel of film such as conventional microfilm which would then be transferred onto the second microfiche. In this way, the editing device becomes a microfilm to microfiche conversion device.

Figure 6:
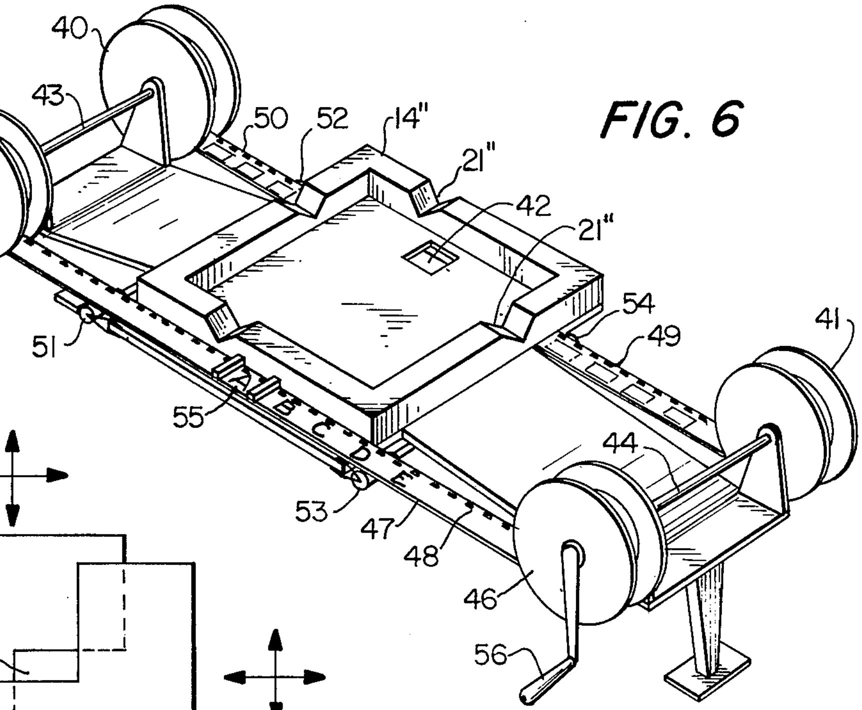
FIG. 6 shows a microfilm to microfiche holder for inserting into the editing device of FIG. 2.
Figure 7A:
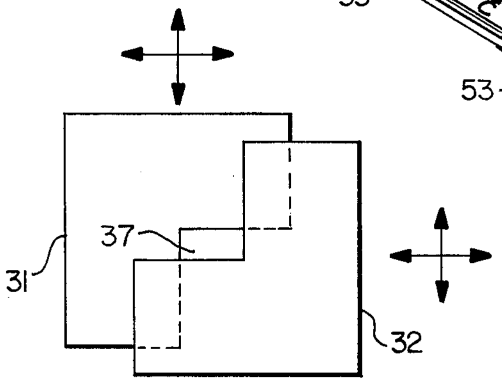
FIGS. 7A through 7E are diagrams showing masks used with the editing device.
Figure 7B:
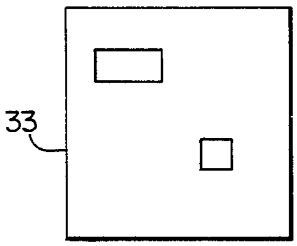
Figure 7C:
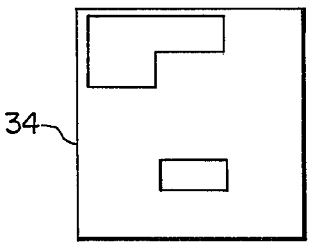
Figure 7D:
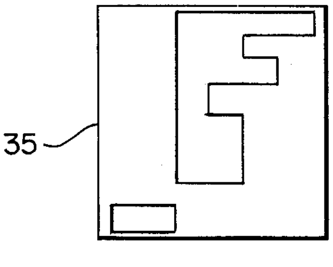
Figure 7E:
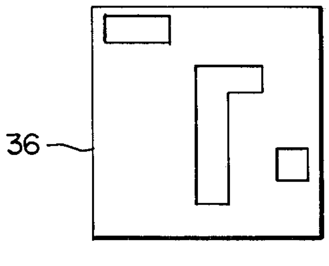

In FIG. 6, there is shown such a modification to the editing device in which the first film retaining means 14 is replaced by a film retaining means 14". Microfilm is dispensed from a first reel 40 to a second reel 41 past a recording aperture 42. The film retaining means 14" is correctly located in the housing of the editing device by single teeth 21" which locate the retaining means in a single position. The reels 40 and 41 are directly coupled by shafts 43 and 44 to further reels 45 and 46, respectively. The further reels 45 and 46 carry an indicating tape 47 whose sprocket holes 48 coincide with sprocket holes 49 of microfilm 50 carried between the reels 40 and 41. Sprockets 51 and 52 on the left hand side of the film retaining means 14" are coupled together to ensure the correspondence of the sprocket holes 48 and 49 and further sprockets 53 and 54 ensure correspondence with the sprocket holes 48 and 49 on the right hand side of the film retaining means 14". The tape 47, as indicated, is at 55 so that the operator viewing through the mirror 12 of Frame 2 knows which housing of the microfilm 50 will appear at the recording aperture 42. Handles 56 are provided to move the tape 47 and microfilm 50.

In FIGS. 7A through 7E, masks show masking out various images on the first microfiche. These masks 31 to 36 are quartz masks and may be used in hospital work. These quartz masks have areas which have beem made impervious to light by similar means as is used for surface silvering or coating of optical components. Masks 31 and 32 are made so that they may be moved relative to one another to form an aperture 37 which is of variable size.

Figure 8:
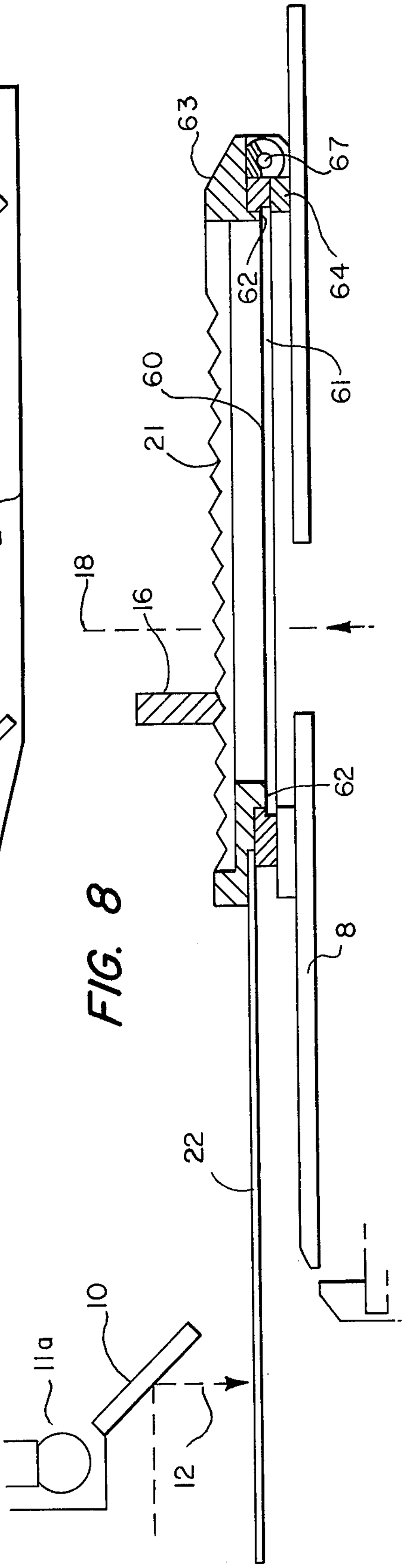
FIG. 8 shows the details of the film retaining means of FIGS. 3 and 4.

In FIG. 8, further details of the film retaining means 14 and 14" are shown, where it can be seen that the first microfiche 60 is located on a glass plate 61 and is trapped by an overhanging lip 62 of a locating frame 63. The locating frame 63 is hinged to a main frame 64 about hinge lug 67 by a hook shaped member. The locating frame 63 can be completely detached from the main frame 64 by opening the two frames out and detaching a hooked member 66 from a hinge lug 67 provided on the main frame 64.

From the preceding description of the preferred embodiments, it is evident that the objects of the invention are attained. Although the invention has been described and illustrated in detail, it is to be clearly understood that the same is by way of illustration and example only and is not to be taken by way of illustration. The spirit and scope of this invention are limited only by the terms of the appended claims.

What is claimed:

1. A microfiche editing and recording device for transmitting a microimage from a first microimage bearing film to a second photographic microfiche film comprising:

a microfiche camera;

a housing mounted to said microfiche camera, said housing being movably mounted to said microfiche camera so as to be moved on said camera to a storage position out of the optical axis of said microfiche camera when not in use as an editing device;

a means in said housing for defining an optical path, a portion of which is aligned with the optical axis of said microfiche camera;

a first film retaining means supported by said housing for holding said first microimage bearing film;

means connected to said first film retaining means for locating said first microimage bearing film in said first film retaining means in a plurality of predetermined X and a plurality of predetermined Y positions relative to said optical path;

means in said microfiche camera and connected to said second film for moving said second microfiche film to a plurality of predetermined X and a plurality of predetermined Y positions relative to said optical axis of said microfiche camera; and means for applying light from said first microimage bearing film to said second microfiche film along said optical path whereby the microimage on said first microimage bearing film is transferred to said second film.

2. A microfiche editing device of claim 1 wherein said locating means includes at least a pair of orthogonal toothed racks, the teeth on said racks having the same spatial dimension as the spatial dimension of said individual segments on said first microfiche and mating with teeth affixed to said housing, one tooth for each rack, and a sprung table for biasing said racks into interlocking relationship with said teeth affixed to said housing.

3. A microfiche editing device of claim 1 wherein said first microimage bearing film is a microfiche with a plurality of segments located in rows and columns, wherein said first film retaining means includes a grid extending out of said housing corresponding to said rows and columns on said microfiche and wherein a sighting mirror is mounted to said housing and arranged so that a viewer can see said grid by looking substantially into said housing.

4. A microfiche editing and recording device for transmitting a microimage from a first microfiche having a plurality of segments located in rows and columns to a second photographic microfiche film comprising:

a microfiche camera;

a housing mounted to said microfiche camera;

a means in said housing for defining an optical path, a portion of which is aligned with the optical axis of said microfiche camera;

a first film retaining means supported by said housing for holding said first microfiche;

means connected to said first film retaining means for locating said first microfiche in said first film retaining means in a plurality of predetermined X and a plurality of predetermined Y positions relative to said optical path, said locating means including at least a pair of orthogonal toothed racks, the teeth on said racks having the same spatial dimension as the spatial dimension of said individual segments on said first microfiche and mating with teeth affixed to said housing, one tooth for each rack, and a sprung table for biasing said racks into interlocking relationship with said teeth affixed to said housing;

means in said microfiche camera and connected to said second film for moving said second microfiche film to a plurality of predetermined X and a plurality of predetermined Y positions relative to said optical axis of said microfiche camera; and means for applying light from said first microfiche to said second microfiche film along said optical path whereby the microimage on said first microfiche is transferred to said second film.

5. A microfiche editing and recording device for transmitting a microimage from a first microfiche having a plurality of segments located in rows and columns to a second photographic microfiche film comprising:

a microfiche camera;

a housing mounted to said microfiche camera;

a means in said housing for defining an optical path, a portion of which is aligned with the optical axis of said microfiche camera;

a first film retaining means supported by said housing for holding said first microfiche, said means including a grid extending out of said housing corresponding to said columns and rows on said first microfiche and a sighting mirror mounted to said housing and arranged so that a viewer can see said grid by looking substantially into said housing;

means connected to said first film retaining means for locating said first microfiche in said first film retaining means in a plurality of predetermined X and a plurality of predetermined Y positions relative to said optical path;

means in said microfiche camera and connected to said second film for moving said second microfiche film to a plurality of predetermined X and a plurality of predetermined Y positions relative to said optical axis of said microfiche camera; and means for applying light from said microfiche to said second microfiche film along said optical path whereby the microimage on said first microfiche is transferred to said second film.

6. A microfiche editing and recording device for transmitting a microimage from a first microimage bearing film to a second photographic microfiche film comprising:

a microfiche camera;

a housing mounted to said microfiche camera;

a means in said housing for defining an optical path, a portion of which is aligned with the optical axis of said microfiche camera;

a first film retaining means supported by said housing for holding said first microimage bearing film, said first film being microfilm wound on a reel and said first film retaining means including means for supporting said reel;

means connected to said first film retaining means for locating said first microimage bearing film in said first film retaining means in a plurality of predetermined X and a plurality of predetermined Y positions relative to said optical path, said locating means including a second reel for receiving said microfilm and moving said microfilm along the X axis relative to said optical path and means to prevent movement along the Y axis;

means in said microfiche camera and connected to said second film for moving said second microfiche film to a plurality of predetermined X and a plurality of predetermined Y positions relative to said optical axis of said microfiche camera; and means for applying light from said first microimage bearing film to said second microfiche film along said optical path whereby the microimage on said first microfiche bearing film is transferred to said second film.

7. A microfiche editing device of claim 6 wherein said locating means includes a fram indicating tape wound on a pair of reels and means synchronizing said reels of said tape and said reels of said microfilm so as to indicate the frame on said microfiche which lies in said optical path.

8. A microfiche editing device of claim 6 wherein said first film retaining means further includes a plate with an aperture therein, said aperture lies in said optical path and said microfilm is moved past said aperture.

9. A microfiche editing device of claim 8 wherein said housing includes a cruciform and wherein said preventing means includes two pairs of notches on said plate, said cruciform is received by said notches to align said aperture in said optical path.

10. A microfiche editing device of claim 6 wherein said housing is movably mounted to said microfiche camera so as to be moved on said camera to a storage position out of the optical axis of said microfiche camera when not in use as an editing device.

* * * * *